US010247257B2

(12) United States Patent
Back (10) Patent No.: US 10,247,257 B2
(45) Date of Patent: Apr. 2, 2019

(54) SYNCHRONIZER AND METHOD FOR SHIFTING A GEAR (71) Applicant: HOERBIGER Antriebstechnik Holding GmbH, Schongau (DE)

(72) Inventor: Ottmar Back, Weilheim (DE)

(73) Assignee: HOERBIGER ANTRIEBSTECHNIK HOLDING GMBH, Schongau (DE)

(*) Notice: Subject to any disclaimer, the term of this patent is extended or adjusted under 35 U.S.C. 154(b) by 305 days.

(21) Appl. No.: 14/914,740

(22) PCT Filed: Aug. 28, 2014

(86) PCT No.: PCT/EP2014/068294
§ 371 (c)(1),
(2) Date: Feb. 26, 2016

(87) PCT Pub. No.: WO2015/028566
PCT Pub. Date: Mar. 5, 2015

(65) Prior Publication Data
US 2016/0201736 A1 Jul. 14, 2016

(30) Foreign Application Priority Data
Sep. 2, 2013 (DE) .................. 10 2013 109 568

(51) Int. Cl.
F16D 23/06 (2006.01)
F16H 63/30 (2006.01)

(52) U.S. Cl.
CPC ............ F16D 23/06 (2013.01); F16H 63/30 (2013.01); F16D 2023/0618 (2013.01); F16D 2023/0631 (2013.01); F16H 2063/3093 (2013.01)

(58) Field of Classification Search
None
See application file for complete search history.

(56) References Cited

U.S. PATENT DOCUMENTS 4,033,437 A * 7/1977 Labat .................. F16D 23/0612
192/53.33
5,085,303 A * 2/1992 Frost ...................... F16D 23/06
192/53.32

(Continued)

FOREIGN PATENT DOCUMENTS

DE 2127395 A1 12/1971
DE 2222077 A1 11/1973

(Continued)

OTHER PUBLICATIONS

PCT International Preliminary Report on Patentability mailed in PCT/EP2014/068294 dated Mar. 8, 2016, 7 pages.

(Continued)

Primary Examiner — Colby M Hansen
(74) Attorney, Agent, or Firm — Dilworth IP, LLC (57) ABSTRACT A synchronizer (10) for a gear transmission has a synchronizer body (12), which is associated to a transmission shaft, and a first and a second synchronizer ring (32, 34, 36, 38) which are associated to a first and a second transmission gear (28, 30). Furthermore, the synchronizer (10) has a sliding sleeve (26) and at least one thrust piece (18) which is shiftably arranged on the synchronizer body (12) and can exert an axial compressive force on the corresponding synchronizer ring (32, 34, 36, 38). Furthermore, the synchronizer (10) includes an elastic actuating element (20) which is active between the sliding sleeve (26) and the thrust piece (18), wherein on the sliding sleeve (26) a detent recess (50) for the neutral position as well as a release contour (54) are provided. The release contour (54) can cooperate with the actuating element (20) such that when the sliding sleeve (26) is shifted for being engaged with one of the transmission gears (28, 30), the thrust piece (18) is urged away from the corresponding synchronizer ring (32, 34, 36, 38). The release contour (54) has an axial length which is not more (Continued)

than twice the idle stroke of the sliding sleeve (26) between the neutral position and the position in which the corresponding synchronizer ring (32, 34, 36, 38) presses against an associated friction surface.

18 Claims, 4 Drawing Sheets

(56) References Cited

U.S. PATENT DOCUMENTS

| | | | | |
|---|---|---|---|---|
| 5,862,900 | A | * | 1/1999 | Sailler, Jr. ............... F16D 21/04 192/114 R |
| 6,296,100 | B1 | * | 10/2001 | Schetter .................. F16D 23/06 192/108 |
| 2002/0063030 | A1 | * | 5/2002 | Fernandez ............. F16D 23/06 192/53.341 |
| 2008/0179159 | A1 | * | 7/2008 | Pollman .................. F16D 13/30 192/66.22 |
| 2011/0214522 | A1 | | 9/2011 | Sporleder et al. |

FOREIGN PATENT DOCUMENTS

| | | |
|---|---|---|
| DE | 4404093 C1 | 5/1995 |
| EP | 2163778 A2 | 3/2010 |
| EP | 2166244 A1 | 3/2010 |
| EP | 2299139 A1 | 3/2011 |
| GB | 1335865 | 10/1973 |
| GB | 2184177 A | 6/1987 |
| GB | 2286436 A | 8/1995 |
| JP | S54182757 U | 12/1979 |
| JP | S5860027 U | 4/1983 |
| JP | H234833 U | 3/1990 |
| JP | 2000154834 A | 6/2000 |
| JP | 2009103248 A | 5/2009 |

OTHER PUBLICATIONS

German Search Report dated May 14, 2014 from Application No. 102013109568.2, along with unofficial English translation, 9 pages.
Japanese Office Action dated Mar. 13, 2018 in JP Application No. 2016-539482.
Chinese Office Action dated Mar. 24, 2017 from corresponding CN Application No. 201480048294.3, along with unofficial English translation, 16 pages.

* cited by examiner

SYNCHRONIZER AND METHOD FOR SHIFTING A GEAR

This invention relates to a synchronizer for a gear transmission and to a method for shifting a gear in a synchronizer.

From the prior art synchronizers are known, which include a synchronizer body associated to a transmission shaft. On the synchronizer body a thrust piece typically is shiftably arranged, which during a shifting operation is moved by a sliding sleeve such that it activates a synchronizer ring. The synchronizer ring in turn cooperates with a transmission gear, whereby the rotational speeds of the synchronizer body and of the corresponding transmission gear can be synchronized. After synchronization of the rotational speeds, the sliding sleeve is shifted further so that a torque can be transmitted from the synchronizer body arranged on the transmission shaft to the corresponding transmission gear.

It was found that on meshing of the sliding sleeve on the transmission gear, the synchronizer ring continues to be axially loaded by the thrust piece such that a friction moment is obtained, which must be overcome on meshing. The cause for the further axial loading of the synchronizer ring by the thrust piece chiefly is the friction between the thrust piece and the synchronizer body on which the thrust piece is arranged. Due to the friction between the thrust piece and the synchronizer body an axial return movement of the thrust piece is prevented. The disadvantage consists in that when engaging a gear, an increased expenditure of force is necessary in order to overcome the frictional force generated by the synchronizer ring via the thrust piece. This problem occurs in particular when a vehicle is stationary.

It therefore is the object of the invention to create a synchronizer which provides for smoothly engaging the gear.

According to the invention this object is solved by a synchronizer for a gear transmission, comprising a synchronizer body which is associated to a transmission shaft, a first and a second synchronizer ring which are associated to a first and a second transmission gear and during a shifting operation can synchronize the rotational speeds of the synchronizer body and the corresponding transmission gear, a sliding sleeve which is non-rotatably arranged on the synchronizer body and can be shifted from a neutral position in opposite directions into a first and a second shifting position in order to non-rotatably couple the first and the second transmission gear with the synchronizer body, and at least one thrust piece which is shiftably arranged on the synchronizer body and during a shifting operating can exert an axial compressive force on the corresponding synchronizer ring, wherein an elastic actuating element is provided, which is active between the sliding sleeve and the thrust piece, wherein a detent recess for the neutral position as well as a release contour are provided on the sliding sleeve, wherein the release contour can cooperate with the actuating element such that when the sliding sleeve is shifted for being engaged with one of the transmission gears, the thrust piece is urged away from the corresponding synchronizer ring, and wherein the release contour has an axial length which is not more than twice the idle stroke of the sliding sleeve between the neutral position and the position in which the corresponding synchronizer ring presses against an associated friction surface.

The idea underlying the invention consists in dividing the pressing operation of the thrust piece into two portions: in a first portion the thrust piece is pressed against the synchronizer ring so that the friction moment required for the pre-synchronization is generated, and in a second portion the thrust piece is actively released so that the synchronizer ring no longer is pressurized. As a result, no friction occurs in the friction package consisting of the synchronizer ring and the corresponding transmission gear. Furthermore, an increased synchronizer capacity can be achieved with the synchronizer according to the invention, as smaller cone angles can be used. The length of the release contour is designed such that when releasing the friction package, the opposed friction package is not loaded so that no unwanted friction occurs there.

In particular, the actuating element includes a spring which is arranged on the thrust piece. Via the spring, the elasticity of the actuating element is provided such that the actuating element can slide along the release contour and the detent recess of the sliding sleeve.

One aspect of the invention provides that the actuating element comprises a ball which in the neutral position is urged into the detent recess of the sliding sleeve by the spring. The formation of the actuating element as a ball pressurized by a spring ensures that the sliding sleeve is held in the neutral position due to its detent recess. As a result, a force overcoming the spring force is required, in order to trigger the shifting operation.

A further aspect of the invention provides that the release contour is adjoined by a protrusion on the side associated to the detent recess and by a holding portion on the opposite side. The protrusion defines the point from which during shifting the actuating element transitions from the detent recess into the release contour, whereby the point is defined at which the thrust piece is moved back and releasing of the friction package starts. The holding portion adjoins the release contour, wherein the holding portion is designed such that releasing of the friction package is maintained and in addition the other friction package is not loaded.

In particular, the center of the protrusion has an axial distance to the center of the detent recess which is smaller than the axial shifting path of the sliding sleeve which is covered in order to transmit a torque from the synchronizer body to one of the transmission gears. The distance in particular is smaller than the axial shifting path of the sliding sleeve minus the distance which is covered by the thrust piece from the neutral position until abutment against the corresponding synchronizer ring. It thereby is achieved that the friction package to be released already is released at the beginning of meshing, so that smooth meshing is possible.

A further aspect of the invention provides that the release contour includes an angle $\alpha$ to the axial alignment of the synchronizer, which lies between 10° and 40°, in particular is 25°. Via the angle $\alpha$, the axial force is adjusted which acts on the thrust piece from the release contour via the actuating element, whereby the thrust piece can be shifted axially and the friction package is released correspondingly. If the angle assumed was too small a value, the axial force would not be sufficient to correspondingly axially shift the thrust piece.

According to one aspect of the invention, the first and the second synchronizer ring each are formed cone-shaped. Via the cone-shaped formation, increased friction values can be achieved. It generally is possible with such synchronizer rings to provide single-cone or double-cone synchronizers.

In particular, one cone-shaped intermediate ring as well as two cone-shaped synchronizer rings are provided per transmission gear, between which synchronizer rings the intermediate ring is arranged so that a triple-cone synchronizer is formed. A triple-cone synchronizer is advantageous because particularly high friction values can be achieved whereby a correspondingly fast synchronization of the rotational speeds is achievable. The friction package accordingly is formed by the intermediate ring, the two synchronizer rings and the associated transmission gear.

A further aspect of the invention provides that the side of the sliding sleeve associated to the synchronizer body is formed mirror-symmetrical with respect to its vertical middle axis. This means that per transmission gear one release contour each is provided whereby it is possible to actively shift the thrust piece on meshing of the sliding sleeve in both gears or transmission gears in order to relieve or release the corresponding friction packages.

Furthermore, the invention relates to a method for shifting a gear in a synchronizer with a synchronizer body which is associated to a transmission shaft, a first and a second synchronizer ring which are associated to a first and a second transmission gear and during a shifting operation can synchronize the rotational speeds of the synchronizer body and the corresponding transmission gear, a sliding sleeve which is non-rotatably arranged on the synchronizer body and from a neutral position can be shifted in opposite directions into a first and a second shifting position, in order to non-rotatably couple the first and the second transmission gear with the synchronizer body, and at least one thrust piece which is shiftably arranged on the synchronizer body and during a shifting operation can exert an axial compressive force on the corresponding synchronizer ring, wherein an elastic actuating element is provided which is active between the sliding sleeve and the thrust piece, comprising the following steps:

a) axially shifting the sliding sleeve from a neutral position to a shifting position, b) pressing the thrust piece rotating with the synchronizer body against the synchronizer ring associated to the transmission gear for pre-synchronization, c) synchronizing the rotational speed of the synchronizer body and the corresponding synchronizer ring with that of the transmission gear, d) further axial shifting of the sliding sleeve to the shifting position after completed synchronization, e) exerting an axial force pointing away from the corresponding transmission gear on the thrust piece, in particular on the actuating element, by the release contour of the sliding sleeve during further axial shifting so that the thrust piece no longer rests or is pressed against the corresponding synchronizer ring, and f) reaching of the shifting position, wherein the actuating element no longer rests against the release contour.

By the method according to the invention the advantages mentioned already for the synchronizer are achieved, according to which the friction package is released on meshing of the sliding sleeve and after completed synchronization so that meshing takes place correspondingly smoothly.

In particular, the exerted axial force is greater than the frictional force between the thrust piece and the synchronizer body. Due to this force ratio, the axial compressive force exerted by the release contour on the actuating element and thus on the thrust piece can overcome the static friction between thrust piece and synchronizer body so that the friction package is actively released.

Further advantages and properties of the invention can be taken from the following description and the following drawings to which reference is made. In the drawings.

Figure 1:
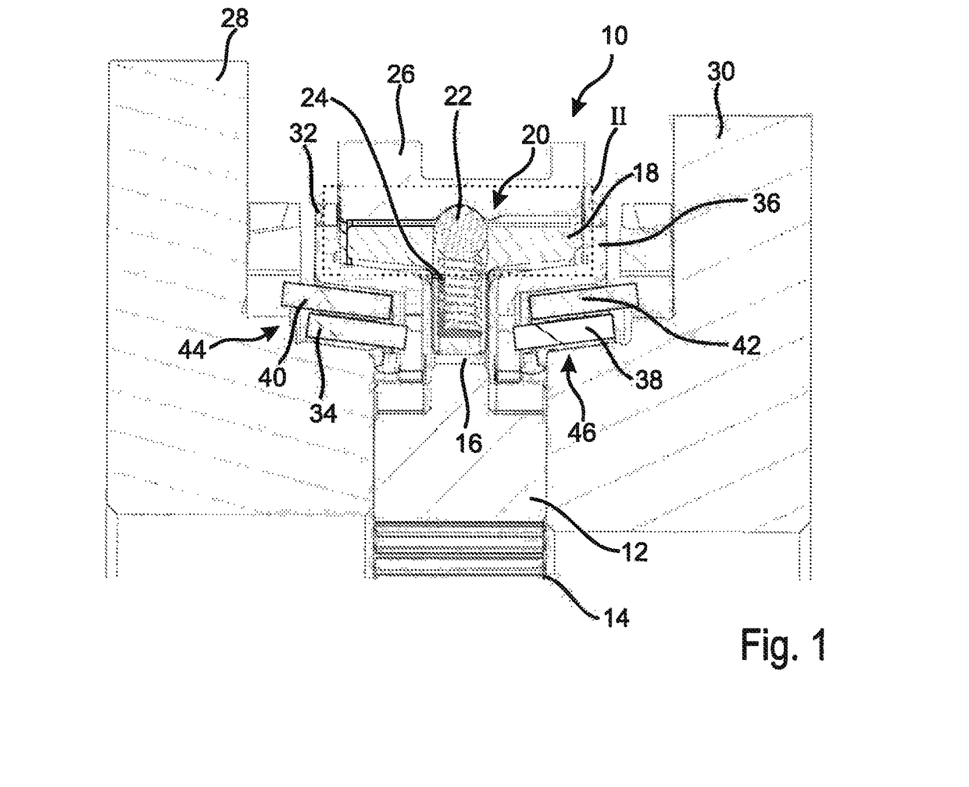
FIG. 1 shows a partial cross-section of a synchronizer according to the invention with two transmission gears associated to the same, wherein the synchronizer is in a neutral position.

FIG. 1 shows a synchronizer 10 which includes a synchronizer body 12 which via a toothing 14 is non-rotatably arranged on a non-illustrated transmission shaft. The transmission shaft rotates about an axis which in FIG. 1 lies horizontally below the toothing 14.

The synchronizer body 12 includes a hub portion 16 in which a thrust piece 18 is shiftably arranged. To the thrust piece 18 an actuating element 20 is associated, which in the embodiment shown is formed by a ball 22 and a spring 24. The spring 24 supports on the thrust piece 18 and urges the ball 22 in direction of a sliding sleeve 26, i.e. radially to the outside.

The sliding sleeve 26 is non-rotatably connected with the synchronizer body 12 and can axially be shifted in opposite directions in order to couple the synchronizer body 12 with a first transmission gear 28 or a second transmission gear 30, whereby a torque can be transmitted from the transmission shaft to the corresponding transmission gear 28, 30. The two transmission gears 28, 30 are arranged on the transmission shaft but can freely rotate on the same unless they are non-rotatably connected to the transmission shaft via the sliding sleeve 26 to the synchronizer body 12 which in turn is non-rotatably connected to the transmission shaft via the toothing 14.

For pre-synchronizing the rotational speeds of the transmission gear 28, 30 and the synchronizer body 12, the synchronizer 10 in the embodiment shown includes a synchronizer ring formed as blocking ring 32, 36, a synchronizer ring 34, 38 as well as an intermediate ring 40, 42 for each transmission gear 28, 30. The blocking rings 32, 36 are non-rotatably connected with the synchronizer body 12. Each of the synchronizer rings 34, 38 is non-rotatably connected with the corresponding blocking ring 32, 36. Each of the intermediate ring 40, 42 is non-rotatably connected with the associated transmission gear 28, 30. Thus, the two intermediate rings 40, 42 rotate with the rotational speed of the corresponding transmission gear 28, 30, while the blocking rings 32, 36 and the synchronizer rings 34, 38 rotate with the rotational speed of the synchronizer body 12.

The blocking rings 32, 36, the synchronizer rings 34, 38 and the intermediate rings 40, 42 all are formed cone-shaped. The contact surfaces between transmission gear and synchronizer ring, between synchronizer ring and intermediate ring as well as between intermediate ring and blocking ring each are formed as friction surface of a triple-cone synchronizer with a friction lining and within a friction package 44, 46, with which the torque required for synchronizing transmission gear 28, 30 and synchronizer body 12 can be generated.

The sliding sleeve 26 has a side 48 associated to the thrust piece 18, which cooperates with the actuating element 20. On this side 48, the sliding sleeve 26 has a detent recess 50 in which the ball 22 of the actuating element 20 is pressurized by the spring 24 in the neutral position of the synchronizer 10. Adjacent to the detent recess 50 a protrusion 52 is formed which is adjoined by a release contour 54 and a holding portion 56 (see FIG. 2).

Figure 2:
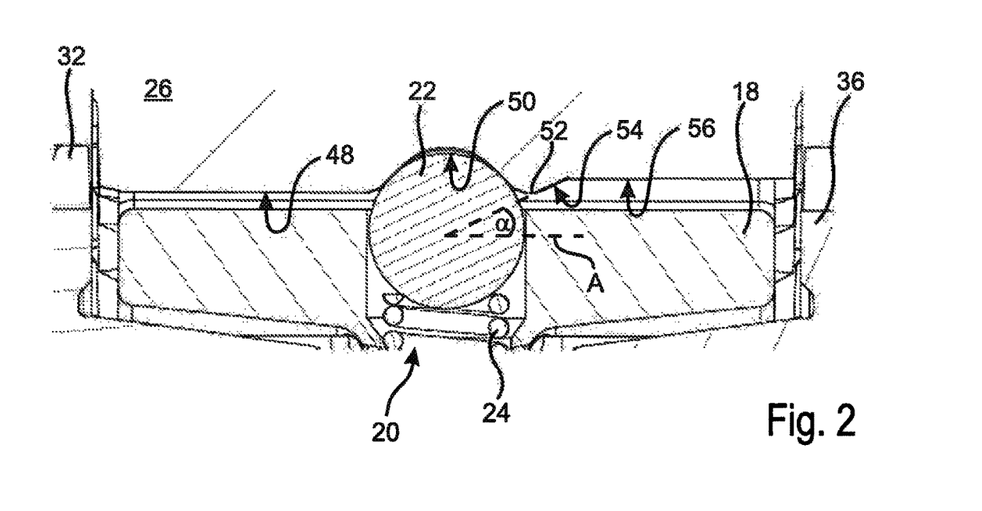
FIG. 2 shows a detail view of FIG. 1.

Relative to the axial alignment A of the synchronizer 10, the release contour 54 is formed inclined by an angle α, wherein it extends linearly in general. Furthermore, the release contour 54 maximally extends along an axial length which corresponds to twice the distance covered by the sliding sleeve 26 until the thrust piece 18 rests against the blocking ring 32. This distance also is referred to as idle stroke or pre-synchronizing path of the sliding sleeve 26.

In the embodiment shown, the holding portion 56 is formed parallel to the axial alignment A of the synchronizer 10 and extends in axial direction up to the end of the sliding sleeve 26, which is associated to the other blocking ring 36.

Figure 8:
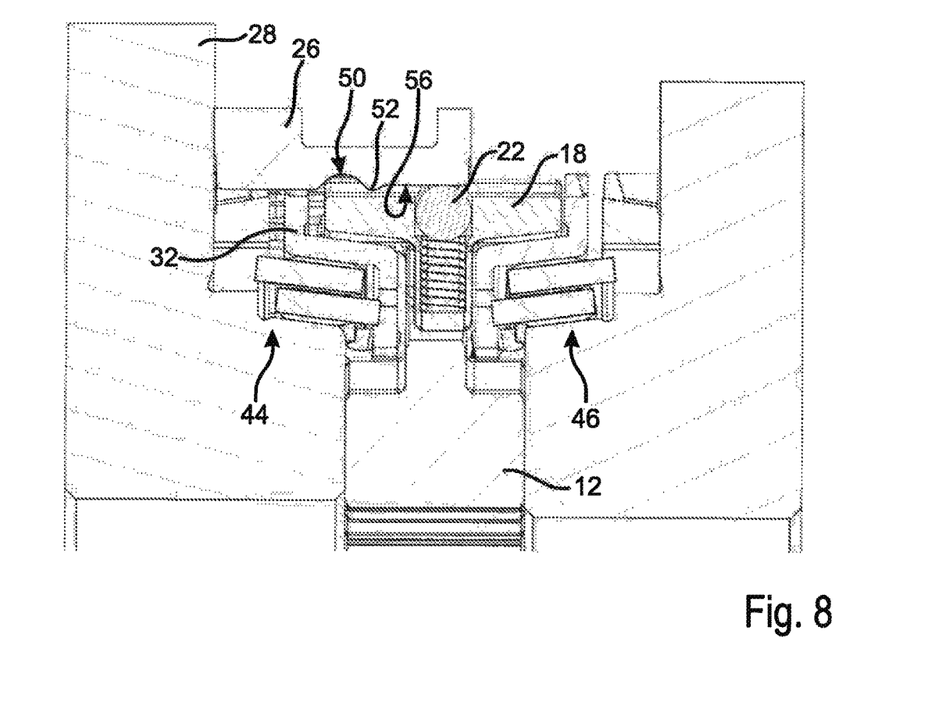
FIG. 8 shows the synchronizer of the previous Figures after completed shifting.

The mode of operation of the synchronizer 10 and in particular of the release contour 54 as well as of the entire side 48 of the sliding sleeve 26 associated to the thrust piece 18 can be taken from the following description, which describes the course of shifting proceeding from the neutral position of the synchronizer 10 as shown in FIG. 1 to a final shifting position of the synchronizer 10 as shown in FIG. 8.

Figure 3:
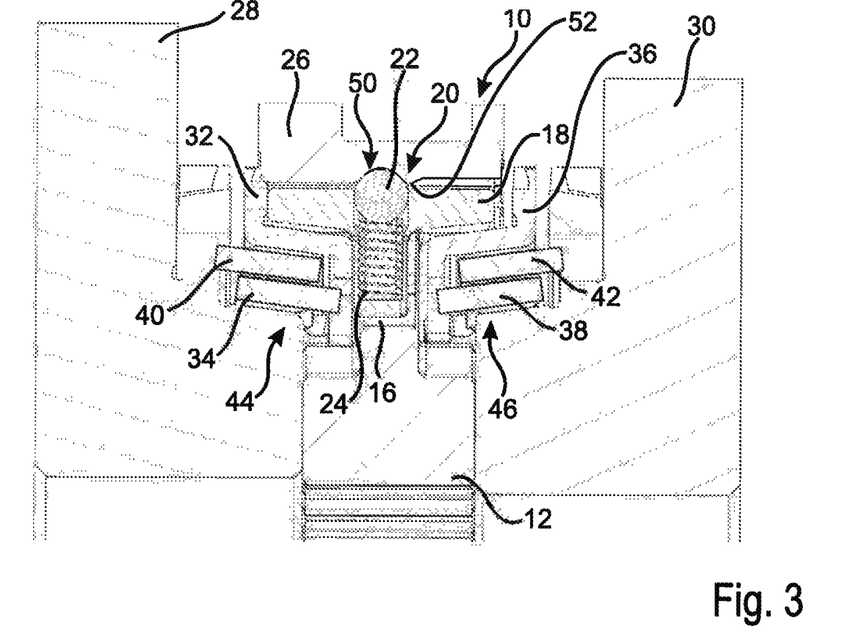
FIG. 3 shows the synchronizer of FIG. 1 in a pre-synchronizing position.

FIG. 3 shows the synchronizer 10 of FIG. 1, wherein the sliding sleeve 26 has been shifted axially to the first transmission gear 28 relative to the condition of FIG. 1 and via the detent recess 50 has entrained the ball 22 of the actuating element 20 so that the thrust piece 18 also is axially shifted within the synchronizer body 12 towards the first transmission gear 28.

Since the thrust piece 18 is axially shifted, the thrust piece 18 rests against the first blocking ring 32 such that the first friction package 44 is loaded. The thrust piece 18 effects indexing of the blocking ring 32 and the sliding sleeve 26. Furthermore, the process of synchronizing the rotational speed of the transmission gear 28 with the rotational speed of the synchronizer body 12 thereby is started.

Figure 4:
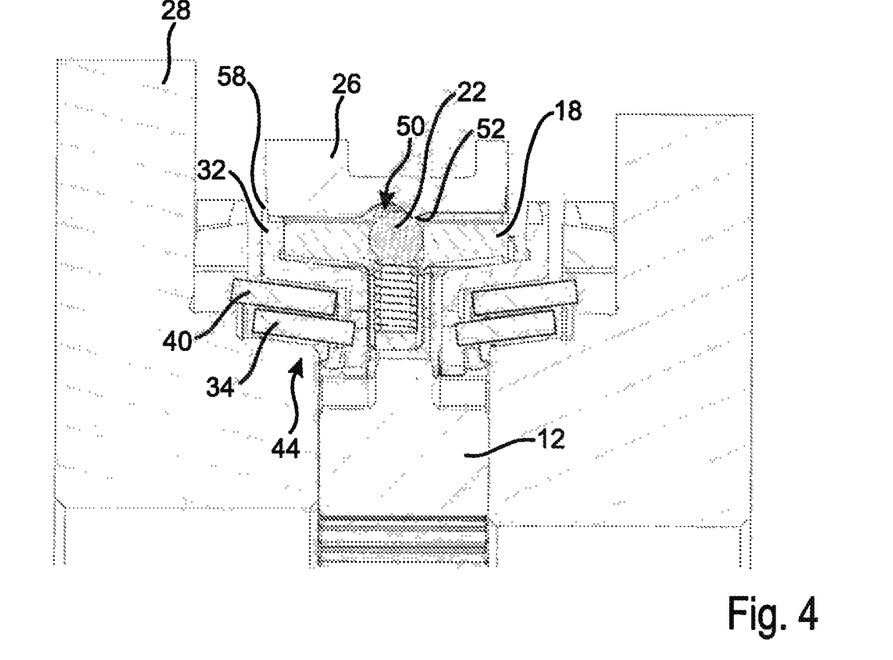
FIG. 4 shows the synchronizer of the previous Figures in a blocking position.

FIG. 4 shows the synchronizer 10 at a later point in time, wherein the synchronizer 10 is in a blocking position. Due to the acting torque between the synchronizer body 12 and the transmission gear 28, the blocking ring 32 is rotated with respect to the synchronizer body 12 to such an extent that external blocking teeth 58 of the internal toothing of the sliding sleeve 26 are opposed to the internal toothing (more exactly the tips 60 of the internal toothing) such that the sliding sleeve 26 cannot be shifted further axially.

When the sliding sleeve 26 is in the blocking position, the ball 22 still is arranged in the region of the detent recess 50 of the sliding sleeve 26, so that the center of the actuating element 20 as shown in the drawing axially is closer to the first transmission gear 28 than the center of the protrusion 52.

Figure 5:
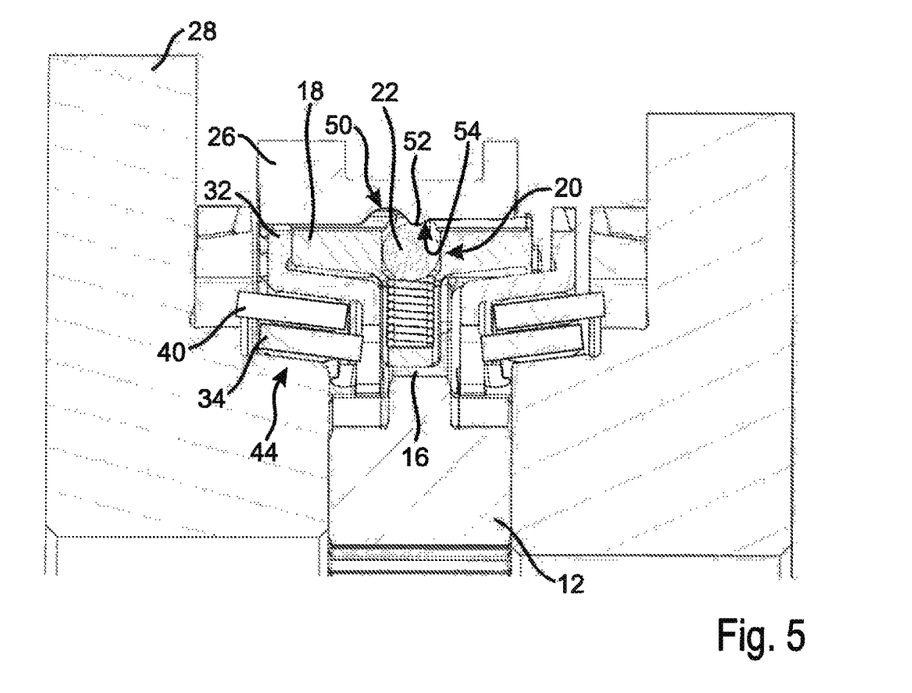
FIG. 5 shows the synchronizer of the previous Figures at a point in time at the end of the blocking position.

FIG. 5 shows the synchronizer 10 in a condition in which the sliding sleeve 26 has been shifted beyond the blocking position in axial direction towards the transmission gear 28. By cooperation of the blocking teeth 58 and the tips 60, the sliding sleeve 26 therefore has rotated the blocking ring 32 out of its blocking position such that the blocking teeth 58 of the blocking ring 32 no longer lie before the tips 60 of the sliding sleeve 26. This was possible as soon as the rotational speeds of transmission gear 28 and synchronizer body 12 have been synchronized sufficiently so that the synchronizing torque acting on the blocking ring 32 collapses.

In the condition of FIG. 5, the sliding sleeve 26 is not yet coupled with the first transmission gear 28 as there can still be seen a gap between sliding sleeve 26 and first transmission gear 28. This condition also is referred to as free-flight phase since at this time the sliding sleeve 26 is in engagement neither with the first blocking ring 32 nor with the first transmission gear 28.

In this condition, the protrusion 52 of the sliding sleeve 26 furthermore still is axially further away from the first transmission gear 28 than the middle of the actuating element 20 as shown in the Figure.

The thrust piece 18 also continues to rest against the first blocking ring 32 whereby the thrust piece 18 axially pressurizes the first blocking ring 32, and the first friction package 44 is loaded.

Figure 6:
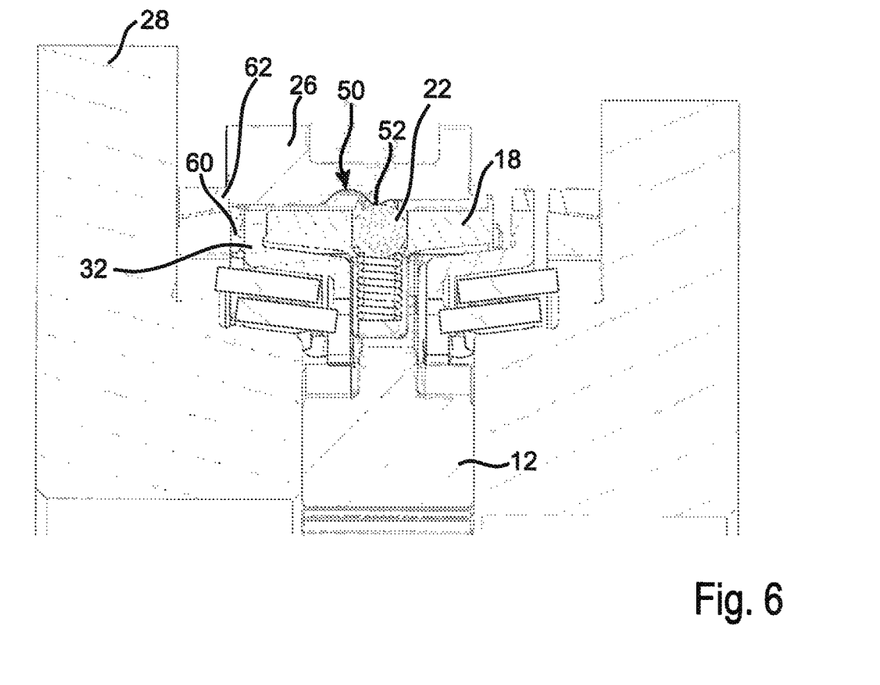
FIG. 6 shows the synchronizer of the previous Figures at the beginning of meshing.

FIG. 6 shows the synchronizer 10 at the beginning of meshing of the sliding sleeve 26 into the first transmission gear 28. The condition of meshing is defined in that the teething-like tips 60 of the sliding sleeve 26 just get in contact with teething-like tips 62 of the first transmission gear 28. In terms of alignment, the tips 62 of the first transmission gear 28 are formed analogous to the blocking teeth 58 of the first blocking ring 32.

In this condition, the beginning of meshing, the ball 22 of the actuating element 20 tangentially rests against the protrusion 52 of the sliding sleeve 26 so that the ball 22 is in an unstable equilibrium, i.e. at the dead center. This means that at the meshing point the ball 22 centrally rests against the protrusion 52 exactly between the detent recess 50 and the release contour 54.

The thrust piece 18 continues to axially rest against the first blocking ring 32 and correspondingly pressurizes the first friction package 44.

Figure 7:
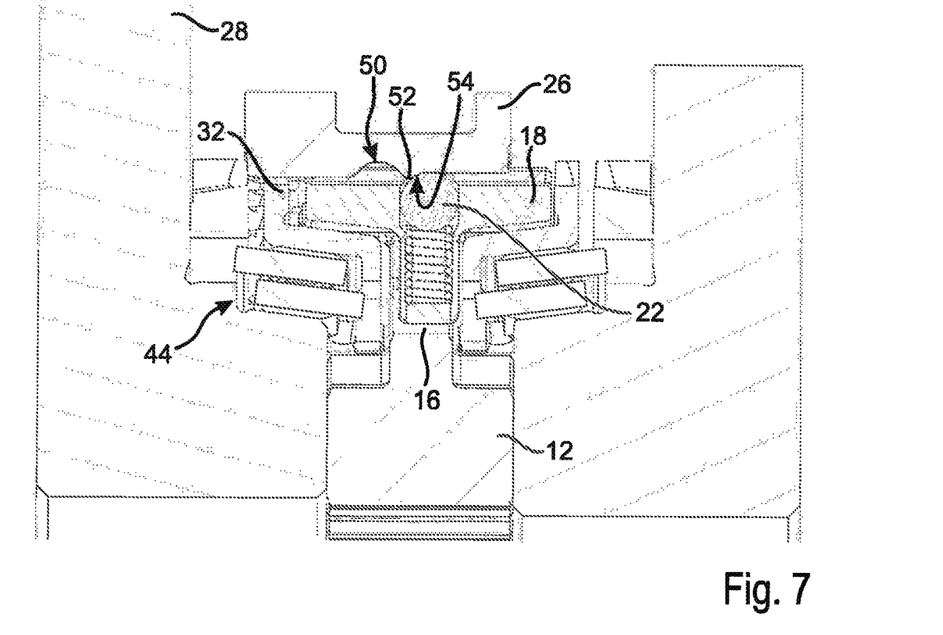
FIG. 7 shows the synchronizer of the previous Figures at a later point in time of meshing.

FIG. 7 shows the synchronizer 10 at a later point in time, wherein the sliding sleeve 26 has been moved minimally with respect to the position of FIG. 6, so that the ball 22 has been brought out of the unstable equilibrium.

The ball 22 has slipped over the protrusion 52 and is pressurized by the spring 24 along the release contour 54. Due to the oblique alignment by the angle α, the release contour 54 generates an axial force on the ball 22 and the actuating element 20, which in turn is axially pressurized by the thrust piece 18. The thrust piece 18 ultimately is urged away from the first transmission gear 28, whereby the first friction package 44 is disengaged or release.

Due to the relief of the first friction package 44, the sliding sleeve 26 can be meshed more smoothly in order to couple with the first transmission gear 28, as no friction moment must be overcome between the synchronizer body 12 and the transmission gear 28.

The angle α of the release contour 54 typically lies between 10° and 40°, in particular is 25°, so that the axial force exerted by the release contour 54 is large enough to overcome the frictional force between the thrust piece 18 and the hub portion 16 of the synchronizer body 12, so that the thrust piece 18 can axially be shifted at all.

The complete shifting of the gear is shown in FIG. 8, wherein the sliding sleeve 26 is coupled into the first transmission gear 28 with the synchronizer body 12, so that a torque can be transmitted from the transmission shaft via the synchronizer body 12 to the first transmission gear 28.

In this condition, the ball 22 rests against the sliding sleeve 26 in the region of a holding portion 56 on the side 48 associated to the thrust piece 18. It thereby is achieved that the axial compressive force exerted on the actuating element 20 is not so large that the thrust piece 18 is urged away from the first transmission gear 28 too far. If this would be the case, the thrust piece 18 might axially pressurize the blocking ring 36 opposite to the first blocking ring 32, whereby the second friction package 46 would be loaded. The axial length of the release contour 54 therefore maximally is as long as twice the idle stroke of the sliding sleeve 26, as already mentioned above.

The course of the holding portion 56 can be formed parallel to the axial alignment A of the synchronizer 10, as shown here, or with a small positive or negative angle. The holding portion 56 however should be formed such that the axial force acting on the ball 22 is small. The force should be so small that the thrust piece 18 does not get in contact with the opposite blocking ring 36 and the second friction package 46 would be loaded.

The shown embodiment of the synchronizer 10 merely has one release contour 54 on the sliding sleeve 26. However, there can also be provided a sliding sleeve 26 which on both sides of the detent recess 50 each includes a protrusion and a release contour along with a holding portion, whereby releasing both friction packages 44, 46 is possible when shifting both gears. Such sliding sleeve 26 is characterized by its mirror symmetry on the side 48.

The invention claimed is:

1. A synchronizer (10) for a gear transmission, comprising a synchronizer body (12) arranged on a transmission shaft, a first and a second synchronizer ring (32, 34, 36, 38) which are proximate to a first and a second transmission gear (28, 30) and during a shifting operation can synchronize rotational speeds of the synchronizer body (12) and the adjacent transmission gear (28, 30), a sliding sleeve (26) which is non-rotatably arranged on the synchronizer body (12) and can be shifted from a neutral position in opposite directions into a first and a second shifting position in order to non-rotatably couple the first and the second transmission gear (28, 30) with the synchronizer body (12), and at least one thrust piece (18) which is shiftably arranged on the synchronizer body (12) and during a shifting operating can exert an axial compressive force on the synchronizer ring (32, 34, 36, 38) corresponding to the transmission gear (28, 30) for pre-synchronization, wherein an elastic actuating element (20) is provided, which is active between the sliding sleeve (26) and the thrust piece (18), characterized in that a detent recess (50) for the neutral position as well as a release contour (54) are provided on the sliding sleeve (26), wherein the detent recess has a center, wherein the release contour (54) can cooperate with the actuating element (20) such that when the sliding sleeve (26) is shifted for being engaged with one of the transmission gears (28, 30), the thrust piece (18) is urged away from the corresponding synchronizer ring (32, 34, 36, 38), and wherein the release contour (54) has an axial length which is not more than twice the idle stroke of the sliding sleeve (26) between the neutral position and the position in which the corresponding synchronizer ring (32, 34, 36, 38) presses against an adjacent friction surface.

2. The synchronizer (10) according to claim 1, characterized in that the actuating element (20) is arranged on the thrust piece (18) via a spring (24).

3. The synchronizer (10) according to claim 2, characterized in that the actuating element (20) comprises a ball (22) which in the neutral position is urged into the detent recess (50) of the sliding sleeve (26) by the spring (24).

4. The synchronizer (10) according to claim 3 characterized in that the release contour (54) includes an angle α to the axial alignment (A) of the synchronizer (10), which lies between 10° and 40° and wherein per transmission gear (28, 30) a cone-shaped intermediate ring (40, 42) and two cone-shaped synchronizer rings (32, 34, 36, 38) are provided, between which the intermediate ring (40, 42) is arranged.

5. The synchronizer (10) according to claim 3, characterized in that the release contour (54) is adjoined by a protrusion (52) on the side nearer to the detent recess (50) and by a holding portion (56) on the opposite side, wherein the center of the protrusion (52) has an axial distance to the center of the detent recess (50) which is smaller than the axial shifting path of the sliding sleeve (26) that is covered, in order to transmit a torque from the synchronizer body (12) to one of the transmission gears (28, 30).

6. The synchronizer (10) according to claim 5, characterized in that the release contour (54) includes an angle α to the axial alignment (A) of the synchronizer (10), which lies between 10° and 40°.

7. The synchronizer (10) according to claim 6, characterized in that per transmission gear (28, 30) a cone-shaped intermediate ring (40, 42) and two cone-shaped synchronizer rings (32, 34, 36, 38) are provided, between which the intermediate ring (40, 42) is arranged.

8. The synchronizer (10) according to claim 5, characterized in that per transmission gear (28, 30) a cone-shaped intermediate ring (40, 42) and two cone-shaped synchronizer rings (32, 34, 36, 38) are provided, between which the intermediate ring (40, 42) is arranged.

9. The synchronizer (10) according to claim 1, characterized in that the release contour (54) is adjoined by a protrusion (52) on the side nearer to the detent recess (50) and by a holding portion (56) on the opposite side, wherein the center of the protrusion (52) has an axial distance to the center of the detent recess (50) which is smaller than the axial shifting path of the sliding sleeve (26) that is covered, in order to transmit a torque from the synchronizer body (12) to one of the transmission gears (28, 30).

10. The synchronizer (10) according to claim 9, characterized in that the center of the protrusion (52) has an axial distance to the center of the detent recess (50) which is smaller than the axial shifting path of the sliding sleeve (26) minus the distance covered by the thrust piece (18) from the neutral position up to the abutment against the corresponding synchronizer ring (32, 36).

11. The synchronizer (10) according to claim 9, characterized in that the release contour (54) includes an angle α to the axial alignment (A) of the synchronizer (10), which lies between 10° and 40°.

12. The synchronizer (10) according to claim 11, characterized in that per transmission gear (28, 30) a cone-shaped intermediate ring (40, 42) and two cone-shaped synchronizer rings (32, 34, 36, 38) are provided, between which the intermediate ring (40, 42) is arranged so that a triple-cone synchronizer is formed.

13. The synchronizer (10) according to claim 9, characterized in that per transmission gear (28, 30) a cone-shaped intermediate ring (40, 42) and two cone-shaped synchronizer rings (32, 34, 36, 38) are provided, between which the intermediate ring (40, 42) is arranged so that a triple-cone synchronizer is formed.

14. The synchronizer (10) according to claim 1, characterized in that the release contour (54) includes an angle α to the axial alignment (A) of the synchronizer (10), which lies between 10° and 40°.

15. The synchronizer (10) according to claim 14, characterized in that per transmission gear (28, 30) a cone-shaped intermediate ring (40, 42) and two cone-shaped synchronizer rings (32, 34, 36, 38) are provided, between which the intermediate ring (40, 42) is arranged.

16. The synchronizer (10) according to claim 1, characterized in that each of the first and the second synchronizer ring (32, 34, 36, 38) is formed cone-shaped.

17. The synchronizer (10) according to claim 16, characterized in that per transmission gear (28, 30) a cone-shaped intermediate ring (40, 42) and two cone-shaped synchronizer rings (32, 34, 36, 38) are provided, between which the intermediate ring (40, 42) is arranged.

18. The synchronizer (10) according to claim 1, characterized in that the side of the sliding sleeve (26) adjoining the synchronizer body (12) is formed mirror-symmetrical with respect to its vertical middle axis.

* * * * *